April 24, 1934. J. LUNDGREN 1,956,126

DYNAMIC BALANCE CALCULATOR

Filed Feb. 28, 1930 3 Sheets-Sheet 1

Inventor
Jacob Lundgren
By Herbert S. Fairbanks
Attorney.

April 24, 1934. J. LUNDGREN 1,956,126
DYNAMIC BALANCE CALCULATOR
Filed Feb. 28, 1930  3 Sheets-Sheet 2

INVENTOR
Jacob Lundgren
BY
Herbert S. Fairbanks
ATTORNEY

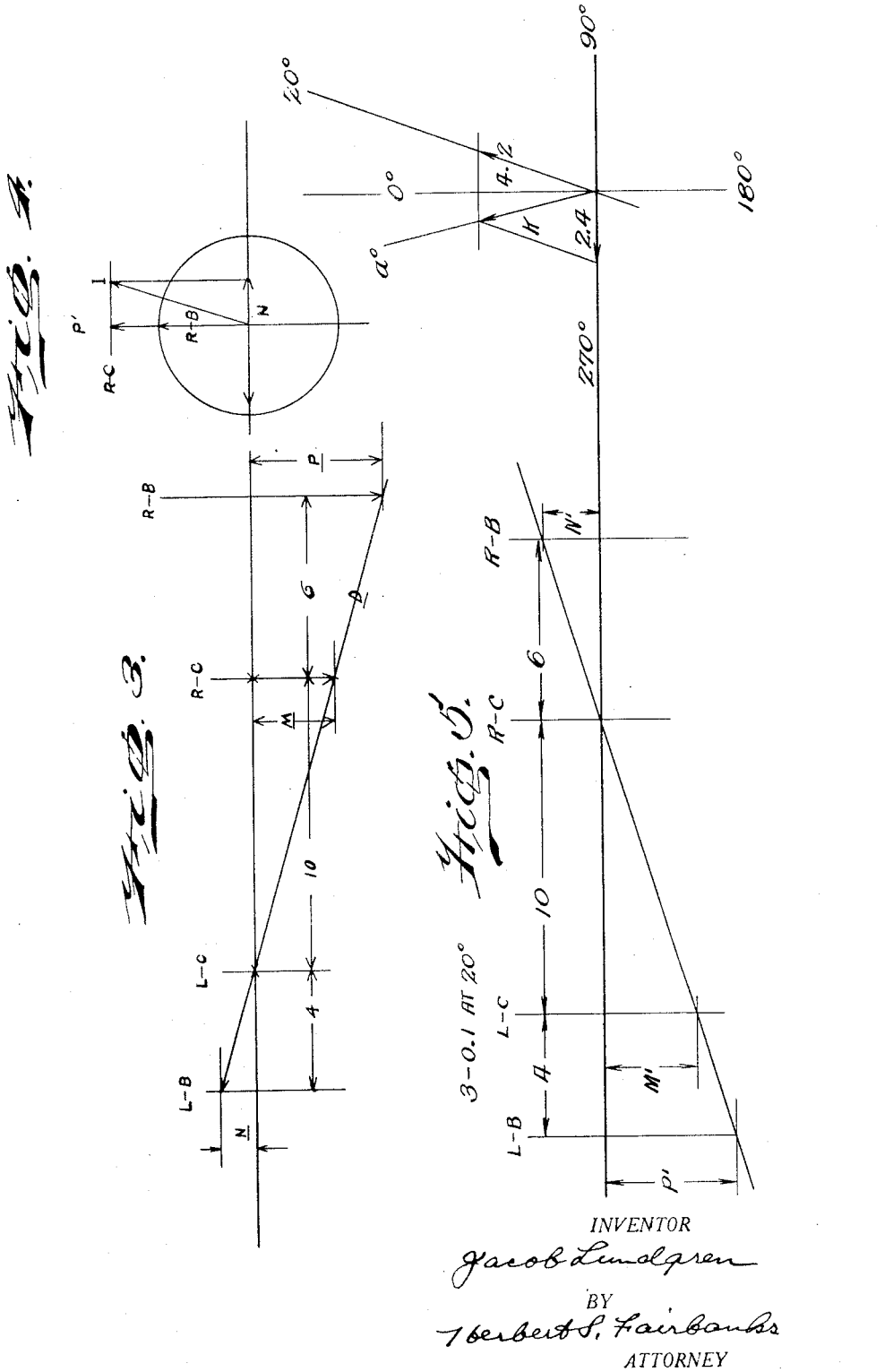

Patented Apr. 24, 1934

1,956,126

UNITED STATES PATENT OFFICE 1,956,126

DYNAMIC BALANCE CALCULATOR

Jacob Lundgren, Philadelphia, Pa., assignor to Tinius Olsen Testing Machine Company, Philadelphia, Pa., a corporation of Pennsylvania Application February 28, 1930, Serial No. 432,046

9 Claims. (Cl. 235—61)

In my copending application Serial No. 289,235 filed June 29, 1928, I have disclosed and broadly claimed a method of and apparatus for calculating from unbalance readings the proper angle and amount of unbalance of a specimen to be transferred to selected planes of correction.

The present application discloses a novel apparatus for accomplishing the same result.

It is necessary in order to correct the unbalance in a rotatable body to determine the angle of unbalance and also its linear location. The specimens under test are often of such a character in commercial balancing that the correction cannot be made at the point at which the unbalance is determined. It therefore becomes necessary to transfer the unbalance readings to selected planes of correction along the axis of the specimen under test.

In the methods and constructions heretofore employed, it has been necessary to mathematically compute from the unbalanced readings a new angle or angles and the amount of correction at a predetermined point or points along the specimen at which the unbalanced correction can be most conveniently made without injury to the specimen. A calculation of this character cannot be made by the average workman, and even when made by an expert in this art, a considerable amount of time is necessary to determine the angle and the proper amount for correction of unbalance at the transfer points of the specimen.

With the above in view, the object of this invention is to devise a novel method of and apparatus for determining the proper angle or angles of correction and the amount of unbalance at a point or points along the axis of the specimen different from the points of support.

A further object of this invention is to devise novel transfer mechanism which can be employed by an unskilled person and which can be used in conjunction with any desired or conventional type of balancing machine, in order to determine the angle and amount of unbalance at the transfer points of correction of the specimen.

A further object of this invention is to devise a novel system and a novel method of calculating from previously obtained data the position and the amount of the force to be balanced.

A further object of the invention is to devise novel mechanism of the character herein set forth, which can be conveniently attached to, and, if desired, form a part of a balancing machine, so that the operator of the machine during the balancing operation can, not only determine the angle and linear location of the unbalance shown by the readings of the machine, but he can also determine and transfer the correct amount and angle of unbalance at any desired point along the axis of the specimen without removing the specimen from the balancing machine and without turning the specimen around in the balancing machine.

With the above and other objects in view, as will hereinafter be clearly set forth, my invention comprehends a novel method of and apparatus for calculating, from previously obtained unbalance readings of a specimen, the location and amount of the force to be balanced.

It further comprehends a novel method of and apparatus for calculating from previously obtained unbalance readings of a specimen the correction for unbalance in two selected planes along the axis of the specimen.

It further comprehends novel constructions and arrangements of scales and indicators to enable the determining of the correct unbalance at transfer points corresponding to selected points along the axis of the specimen, the unbalance of which is to be corrected.

Other novel features of construction and advantage will hereafter more clearly appear in the detailed description and the appended claims.

For the purpose of illustrating my invention, I have shown in the accompanying drawings a form thereof which is at present preferred by me, since it will give in practice satisfactory and reliable results, although it is to be understood that the various instrumentalities of which my invention consists can be variously arranged and organized and my invention is not limited to the precise arrangement and organization of these instrumentalities as herein shown and described.

Figures 3 and 4 are diagrams illustrative of the theory of the invention.

Figure 5 is a diagram illustrating the theory of the invention where the pivot is at the right hand plane of correction instead of the left hand plane of correction as in Figure 3.

Similar numerals of reference indicate corresponding parts.

Referring to the drawings:—

Figure 1:
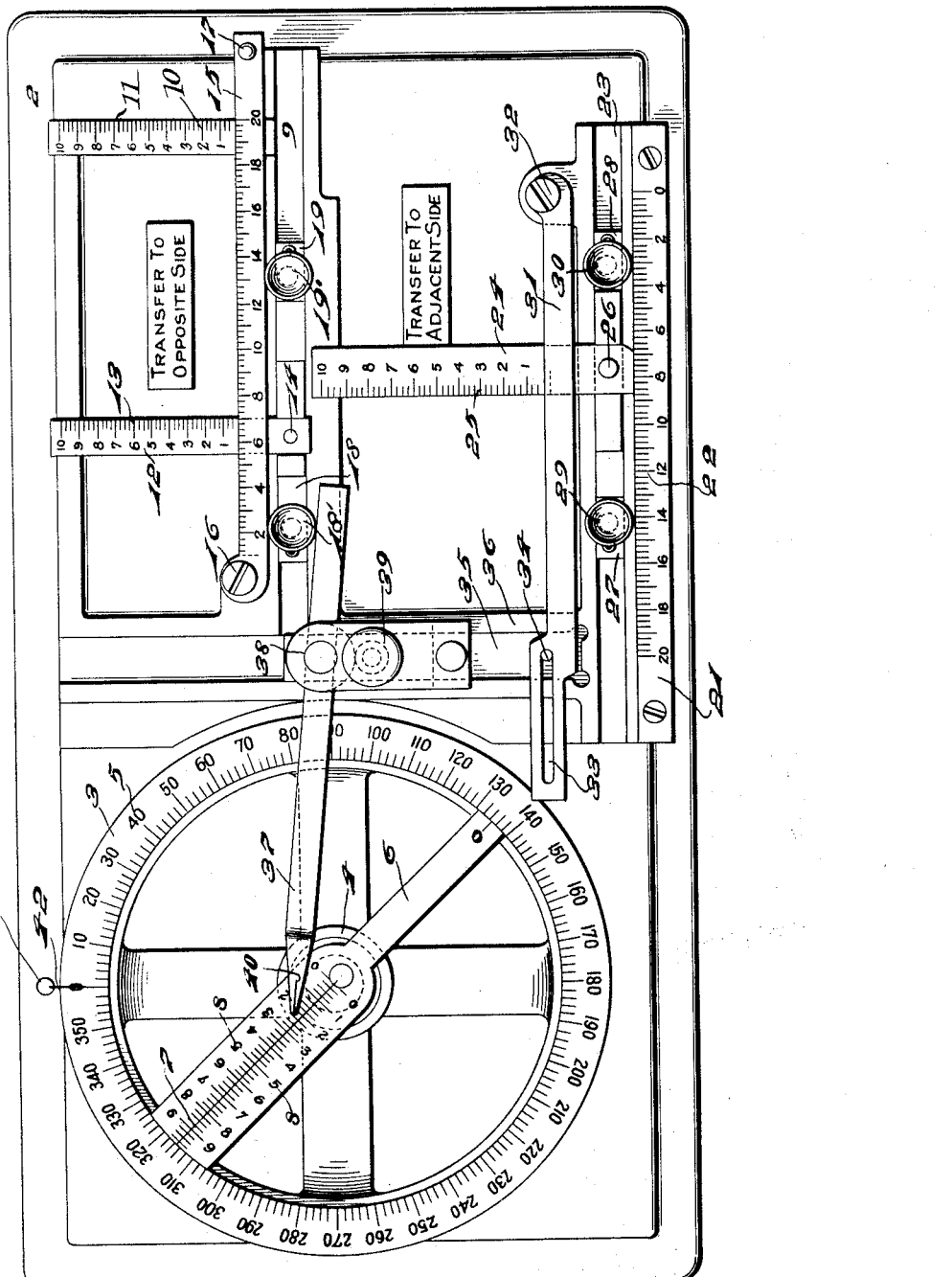
Figure 1 is a top plan view of an apparatus for calculating from previously obtained data the position and amount of the force to be balanced in the specimen and adapted to be advantageously employed in carrying out my novel method.
Figure 2:
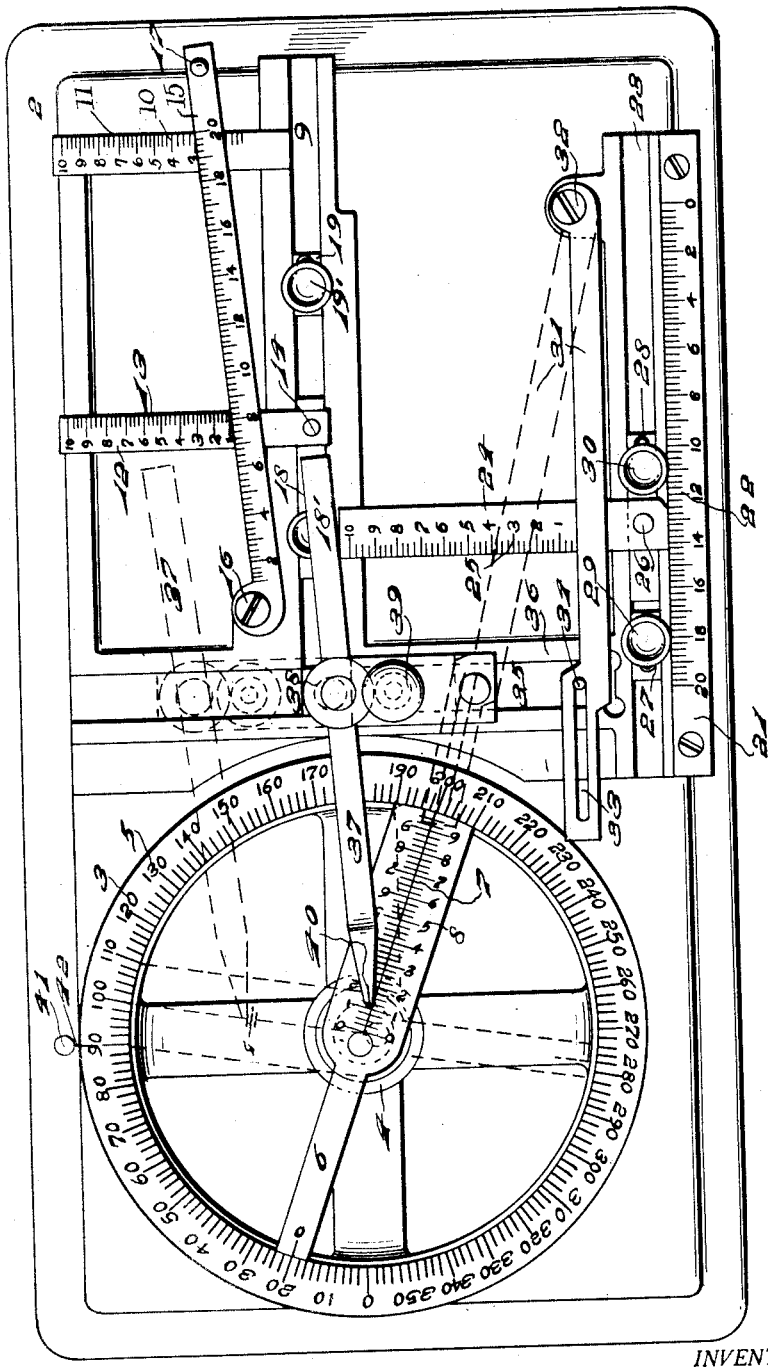
Figure 2 is a top plan view similar to Figure 1 but showing the parts in a different setting.

The transfer mechanism may be supported in any desired manner and may form, if desired, a part of a balancing machine of any desired or conventional type in which the readings for dynamic balance of a rotatable specimen can be determined.

I will first describe the transfer instrument.

The transfer instrument 1 is provided with a base 2 adapted to be mounted on a panel supported in any desired manner. 3 designates a rotatable angle indicator pivoted at 4 and in the form of a ring having graduations 5 indicative of three hundred and sixty degrees. An arm 6 is rotatably mounted on the pivot 4 and has its opposite ends in close proximity to the graduations on the angle indicator 3. The arm 6 has its median line 7 indicated on it at each end and at one end carries the symbol 0. At the opposite side of its pivot the arm 6 is provided with graduations 8 indicative of ounce inches.

The base 2 is provided with a channel 9 having near one end a fixed scale 10 disposed perpendicularly to it and provided with graduations 11 indicative of ounce inches. An adjustable scale 12 having graduations 13, indicative of ounce inches, is disposed perpendicularly with respect to the channel 9 and has one end slidably mounted in it, and, for ease of manipulation, it is provided with a grasping handle 14. 15 designates a transfer arm in the form of a scale pivoted at one end as at 16 and provided at its opposite end with a grasping portion 17. The channel 9 has slidably mounted in it on opposite sides of the transfer scale 12 adjustable stops 18 and 19, respectively, which can be fixed in position by grasping portions 18' and 19', respectively, in the form of set screws which fix the stops in the positions to which they have been adjusted.

A fixed scale 21 having graduations 22 is mounted on the base 1 along a longitudinally extending channel 23 in which is slidably mounted a scale 24 having graduations 25 indicative of ounce inches and provided with a grasping portion 26. On opposite sides of the scale 24 are stops 27 and 28, respectively, which are secured in fixed position by screws 29 and 30, respectively, which form grasping portions.

A transfer arm 31 is pivoted at one end as at 32 and at its opposite end it is provided with a slot 33 into which a pin 34 extends. This pin 34 is carried by a slide 35 movable in a channel 36 disposed perpendicularly relatively to the channel 23. A pointer 37 is rotatably mounted at 38 on the slide 35 and is capable of longitudinal adjustment in its mounting. This slide has a handle 39. The pointer has a mark 40 on its median line. 41 is a stationary post having an arm 42 which overhangs the graduations on the angle indicator 3.

In order that the underlying principle of this invention can be readily understood I have shown in figures 3 and 4 diagrams in which R—B is the right bearing support of the specimen under test and L—B is the left bearing support; R—C is the right plane of correction and L—C is the left plane of correction. The distance between the selected planes of corrections is 10. The distance between R—B and R—C is represented as 6 and between L—B and L—C as 4.

The object of the transfer instrument is to find the correction at L—C and R—C that has the same effect on the unbalance body as the readings taken at L—B and R—B.

The same proceedings are used in transfer to R—C as to L—C. I will therefore describe in detail only the R—C correction required.

To simplify the procedure, let us consider L—C as a fixed point of support and determine what forces are required at R—C to counteract the unbalance forces at R—B and L—B.

We will first transfer the force at R—B to R—C. If this force at R—B is represented by M it will increase as P to M on line D and is represented by P' on Figure 4 in the same angular plane as force R—B.

If the force at L—B is represented as M also at R—C the distance N would be the force at L—B transferred to plane R—C but would fall in the opposite angular plane to the force at L—B.

If in Figure 4 this force is represented at N, the component for these two forces would then be I, as shown, which is then the force required at R—C to counterbalance the forces at L—B and R—B around the pivot point L—C. In the same manner, the forces, required at L—C to counterbalance the forces at R—B and L—B when R—C is considered as a pivot point, are determined.

After the scales have been properly set in accordance with a proportional chart furnished with the transfer instrument, the following example will clearly disclose the operation and the manner in which the method is carried out.

The planes in which the correction for unbalance is to be determined are selected in accordance with the character and contour of the specimen under test. The distance between the selected planes of correction are thus determined as well as the distance between them and the points or planes of support of the specimen in the balancing machine.

Let us assume, for example, that the balancing machine shows that the angle of unbalance at the right end of the specimen is 90° and the amount of unbalance four ounce inches, and that the angle of unbalance at the left end of the specimen is 20° and the amount of unbalance is three ounce inches. To transfer the unbalance reading to the right plane of correction as shown at R—C Figure 3, the angle indicator 3 is turned to bring the 90 graduation into registry with the indicator arm 42. The transfer arm 6 is then turned to bring the mark at the zero end into registry with the 20° graduation of the angle indicator 3. The slide 12 is moved to engage the left stop 18. The scale beam 15 is swung upwardly on its pivot 16 to the graduation marked 3 on scale 10. This gives an indication on the adjustable scale 12 of 1 ounce inch. The pointer 37 is moved so that it registers with graduation 1 on arm 6. Scale 24 is now moved to the right to engage its juxtaposed stop and the beam 31 is moved upwardly to indicate 4 thereon. This moves upwardly the slide 35 and the pointer 37 also moves upwardly. The indicator arm 6 is now turned until its center line meets the end of the pointer 37. The reading as transferred is now read on 6 as 5⅜ ounce inches and the angle opposite the center line of transfer arm as 100°. The four ounce inches at 90° when transferred to the right plane of correction thus becomes 5⅜ ounce inches and 100° angle.

In transferring to the left end the angle indicator 3 is set at 20° and the scale 6 with the 0 end on the right angle reading 90°. The scale 12 is moved to engage the right stop. The scale beam 15 is moved upwardly to 4 on the stationary scale 10 giving a reading of 1⅝ on scale 12. The pointer is set to 1⅝ on transfer scale 6. Scale 24 is now moved to engage its left stop and beam 31 is moved upwardly to 3 on scale 24. The transfer arm 6 is turned until its center line meets the mark on the pointer 37. The reading as now transferred is read on transfer scale 6 as 3⅝ ounce inches and 2° angle for the left plane of correction of the specimen under test.

The members 3 and 6 cooperate to form angle indicators which are relatively rotatable and their setting is mechanically determined from the unbalance readings of the specimen to indicate the new angle and the new amount of correction for the selected planes of correction.

The pointer 37 stays in the position to which it is adjusted due to frictional engagement with its mounting and the slide 35 also stays in the position to which it is adjusted due to frictional engagement with the walls of the channel 36. The setting of scales 12 and 24 is dependent on the location of the planes of correction relative to the planes of support. The scale 10 is fixed for example, the proportionate distance between the pivot point 16 and the scale 12, Figure 1, in the first position and between the pivot point 16 and the scale 12, in the second position, is equal to the proportionate distance on the part to be balanced, see Figure 3, four inches to ten inches or six inches to ten inches. In the lower scale the proportionate distance between the center line of the slide 35 and the pivot 32, and the scale 24 and slide 35, is equal to the proportionate distances on the part to be balanced, see Figure 3, $$\frac{10+6}{10} \text{ and } \frac{10+6}{6}.$$

As the scales 12 and 24 are used for transferring at both ends for the part to be balanced, adjustable stops are provided which can be set so that two different positions of scales for right and left hand correction may be quickly located when balancing several similar pieces under the same setting. When the distance between L—B and L—C is the same as the distance between R—C and R—B, only one position of the scales 12 and 24 are required. To eliminate calculations in setting the stops 18 and 19, and 27 and 28 for various values of the distance between L—B and L—C, L—C and R—C, and between R—C and R—B, a proportional chart is ordinarily supplied with the instrument. In the setting of the transfer instrument the first procedure is to set the scales 12 and 24. The positions of the slides to which these scales are attached are different when transfer is made from the left or right end and vice versa. For this reason, stops 18, 19, 29 and 30 are provided so that the slides carrying the scales 12 and 24 may be moved up against the stops for either right or left end transfer. Referring to Figure 3, the positions of the slides are dependent on the distance between the four planes L—B, L—C, R—C, and R—B, these distances being shown as 4, 10 and 6, in Figure 3. If the transfer is to be made, for example, from R—B to R—C and considering L—C as a fixed point, in as much as L—C is a plane of correction at the opposite end of R—C, the problem as given would be $$\left(\frac{10+6}{10}\right) \times 4,$$

the weight required at R—C to counteract the force at R—B. The position of the scale 24, Figure 1 on scale 22, would be $$\left(\frac{10}{10+6}\right) \times 20$$

as at 12.5 on scale 22. For the left end transfer this setting would be $$\left(\frac{10}{10+4}\right) \times 20$$

as at 14.28. In a similar manner, using the values in Figure 3, the setting of the scale 12 on the graduated slide 15, Figure 1, would be for transferring to R—C with L—C as a fixed pivot $$\frac{4}{10} \times 20$$

or at the 8 graduation mark and for transferring from the right end 4 oz. inches to the L—C plane with R—C as a pivot, the setting of the scale 12 on scale 15 would be $$\frac{6}{10} \times 20 = 12.$$

The scale 15 should be in the position shown in Figure 1 when the setting is effected of scale 12. The scale 10 is fixed with its edge at the 20 mark on scale 15 and is not movable.

In Figure 5, the forces at L—B and R—B, three ounce inches and four ounce inches respectively are to be transferred to L—C with R—C as the pivot.

If M' represents the registered force at L—B, the transferred force N' to L—C is represented in magnitude by P' and at 20° angle.

If M' represents the force at R—B, this force transferred to L—C would be in reverse proportion, that is, the force registered at R—B to this force transferred to L—C would be $$\frac{N'}{M'}$$

and in an opposite angle to 90° or at 270°.

Hence, the transferred force to L—C from L—B equals $$\frac{3(10+4)}{10}$$

or 4.2 at 20°.

The transferred force from R—B to L—C equals $$\frac{4+6}{10}$$

or 2.4 at 270°.

The force required for correction at L—C is then K ounce inches at A°.

Having thus described my invention what I claim as new and desire to secure by Letters Patent, is:—

1. In a transfer instrument, a base, two relatively rotatable angle indicators thereon, one of said indicators being graduated in degrees and the other of said indicators being graduated at one side of its center in graduations indicative of ounce inches, and means on said base to mechanically determine from unbalance readings of a specimen the relative rotation of said angle indicators to indicate the angle and amount of unbalance in a selected plane of correction of the specimen.

2. In a transfer instrument, an angle indicator rotatably mounted and graduated in degrees, a transfer arm rotatably mounted in proximity to said graduations and having on one side of its center longitudinally disposed graduations indicative of ounce inches, relatively movable scales, a pivoted transfer beam cooperating with said scales, an adjustable scale, a transfer beam cooperating with said adjustable scale, a slide moved by said transfer beam, and a pointer carried by said slide and capable of rotatable and longitudinal adjustment thereon.

3. In a transfer instrument, a base, an angle indicator having graduations indicative of degrees and rotatably mounted on said base, a stationary arm on said base extending in proximity to said graduations, a rotatable arm mounted on said base concentric with said angle indicator and having a zero mark at one end and on the opposite side of its center graduations indicative of ounce inches, a stationary scale on said base, adjustable stops in proximity thereto, a transfer scale adjustable between said stops, a transfer beam having one end pivoted and extending across said scale, a slide connected with said transfer beam, a pointer adjustably carried by said slide, relatively adjustable scales on said base, a movably mounted transfer scale cooperating with said relatively adjustable scales, and adjustable stops for determining the relative position of the relatively adjustable scales.

4. In a transfer instrument, a base, an angle ring graduated in degrees and rotatably carried by said base, an arm rotatable concentric with said angle ring and having a mark indicative of zero on one side of its center and on its opposite side graduations indicative of ounce inches, a pointer cooperating with the graduations indicative of ounce inches, means to mechanically determine from unbalance readings the change in position of said rotatable arm and of said pointer to determine the angle and amount of unbalance for a selected plane of correction.

5. In a transfer instrument, a base, an angle indicator graduated in degrees rotatably mounted on said base, a transfer arm rotatably mounted on said base and having a marking indicative of zero at one end on its median line and having, opposite its center, graduations indicative of ounce inches, a stationary scale on said base, an adjustable scale, each of said scales having graduations indicative of ounce inches, a transfer beam pivoted at one end, a second adjustable scale having graduations indicative of ounce inches, a transfer beam movable along said adjustable scale and having one end pivoted, a slide movably connected with said transfer beam, and a pointer adjustably carried by said slide.

6. In a transfer instrument, a base, an angle indicator graduated in degrees and rotatably mounted on said base, a transfer arm rotatable on said base concentric with said angle indicator, and having on one side of its center graduations indicative of ounce inches and at its opposite end a zero marking, a stationary scale, a second scale relatively adjustable with respect to the stationary scale, a transfer beam pivoted at one end and movable across said scales, said transfer beam having graduations thereon, adjustable stops for the movable scale, a pointer to cooperate with the graduations on the transfer arm, a slide by which said pointer is movably carried, a transfer beam movably connected with said slide and having one end pivoted, and a scale having graduations indicative of ounce inches adjustably positioned relatively to the transfer arm connected with said slide.

7. In a transfer instrument, a base, an angle indicator graduated in degrees rotatably mounted on said base, a transfer arm having its median line indicated and provided with a zero indication at one end and provided on the opposite side of its center with graduations indicative of ounce inches, a pointer cooperating with the graduations of said transfer arm to indicate a new position of it in accordance with an unbalance reading, means to mechanically determine in accordance with the amount of unbalance at one point of support a first position of said pointer and thereby from the graduations on said transfer arm its position, and means to mechanically determine from an unbalance reading a second position of said pointer and thereby the relative position of said transfer arm and indicator to indicate the angle and amount of unbalance at a selected plane of correction of a specimen.

8. In a transfer instrument, a base, relatively rotatable angle indicators thereon one of which is graduated in degrees and the other of which on one side of its center is graduated in ounce inches and provided with a zero mark, and means on said base to determine the angle and amount of unbalance in a selected plane of correction comprising relatively adjustable stops, a movable scale, adjustable between said stops, a stationary scale, a transfer beam pivoted at one end, said scales being graduated in ounce inches, and a pointer cooperating with one of said rotatable angle indicators.

9. In a transfer instrument, relatively rotatable angle indicators, one of which is graduated in degrees and the other of which on one side of its center has graduations indicative of ounce inches, a pointer cooperating with said graduations indicative of ounce inches, means to mechanically determine from an unbalance reading the position of said pointer to determine the relative rotation of said angle indicators, and means to determine from a second unbalance reading a new position of said pointer to indicate a new setting of said angle indicators to determine the angle and amount of correction for a selected plane of correction.

JACOB LUNDGREN.